United States Patent
Balaraman et al.

(10) Patent No.: US 12,198,023 B2
(45) Date of Patent: Jan. 14, 2025

(54) METHOD AND DEVICE FOR CREATING AND TRAINING MACHINE LEARNING MODELS

(71) Applicant: L&T TECHNOLOGY SERVICES LIMITED, Chennai (IN)

(72) Inventors: Mridul Balaraman, Bangalore (IN); Madhusudan Singh, Bangalore (IN); Amit Kumar, Bangalore (IN); Mrinal Gupta, Jammu (IN); Vidya Suresh, Bangalore (IN); Bhupinder Singh, Patiala (IN); Kartik Nivritti Kadam, Hyderabad (IN)

(73) Assignee: L&T TECHNOLOGY SERVICES LIMITED

( * ) Notice: Subject to any disclaimer, the term of this patent is extended or adjusted under 35 U.S.C. 154(b) by 962 days.

(21) Appl. No.: 17/280,902

(22) PCT Filed: Sep. 28, 2019

(86) PCT No.: PCT/IB2019/058264
§ 371 (c)(1),
(2) Date: Mar. 28, 2021

(87) PCT Pub. No.: WO2020/065627
PCT Pub. Date: Apr. 2, 2020

(65) Prior Publication Data
US 2022/0004921 A1   Jan. 6, 2022

(30) Foreign Application Priority Data

Sep. 28, 2018  (IN) .............................. 201841036688
Dec. 31, 2018  (IN) .............................. 201841050033

(51) Int. Cl.
*G06N 20/00* (2019.01)
*G06F 18/2113* (2023.01)
(Continued)

(52) U.S. Cl.
CPC ......... *G06N 20/00* (2019.01); *G06F 18/2113* (2023.01); *G06F 18/22* (2023.01); *G06F 18/2321* (2023.01)

(58) Field of Classification Search
None
See application file for complete search history.

(56) References Cited

PUBLICATIONS

Chen, Chao, and Mei-Ling Shyu. "Clustering-based binary-class classification for imbalanced data sets." In 2011 IEEE International Conference on Information Reuse & Integration, pp. 384-389. IEEE, 2011. (Year: 2011).*

(Continued)

*Primary Examiner* — Vincent Gonzales
(74) *Attorney, Agent, or Firm* — Kendal M. Sheets

(57) ABSTRACT

A method and a device for creating and training machine learning models is disclosed. In an embodiment, a method for training a machine learning model for identifying entities from data includes creating a first plurality of clusters from a first plurality of data samples in a first dataset and a second plurality of clusters from a second plurality of data samples in a second dataset. The method further includes determining a rank for each of the first plurality of clusters and a rank for each of the second plurality of clusters. The method includes retraining the machine learning model using at least one of the first plurality of clusters weighted based on the rank determined for each of the first plurality of clusters and at least one of the second plurality of clusters weighted based on the rank determined for each of the second plurality of clusters.

19 Claims, 11 Drawing Sheets

(51) Int. Cl.
    *G06F 18/22*     (2023.01)
    *G06F 18/2321*     (2023.01)

(56) References Cited

PUBLICATIONS

Yu, Hwanjo, Jiong Yang, and Jiawei Han. "Classifying large data sets using SVMs with hierarchical clusters." In Proceedings of the ninth ACM SIGKDD international conference on Knowledge discovery and data mining, pp. 306-315. 2003. (Year: 2003).*

Zhou, Yangming, Yangguang Liu, Jiangang Yang, Xiaoqi He, and Liangliang Liu. "A taxonomy of label ranking algorithms." J. Comput. 9, No. 3 (2014): 557-565. (Year: 2014).*

\* cited by examiner

METHOD AND DEVICE FOR CREATING AND TRAINING MACHINE LEARNING MODELS

TECHNICAL FIELD

This disclosure relates generally to machine learning models, and more particularly to method and system for creating and training machine learning models.

BACKGROUND

Digital data (for example, digital images) may be highly inconsistent and may depend on various factors. For digital images, these factors may include, but are not limited to image resolution, noise effect, or font size. Training a machine learning model to identify entities from digital data with high level of accuracy (for example, by performing perform Optical Character Recognition (OCR)) is challenging. Once the machine learning model has been trained to identify entities from a set of pre-defined data (for example, images, symbols, numbers or text), it is difficult to apply the machine learning model to identify entities from a new set of data. The new set of data may be similar to the previous set, but may have new variations that the machine learning model may not recognize.

Some conventional machine learning models that are trained to identify entities from digital data (for example, by using OCR), are trained on similar set of data and are therefore not able to accurately identify data with good accuracy. Some other conventional machine learning models require adding multiple variants of data in a database in order to be trained for entity identification. However, such machine learning models need to be continuously updated in order to handle new variants of data. Pushing all such variants of data (for example, multiple variations of character images) to the database may overload it. Moreover, manually selecting and adding variants of data to the database may require people expertise and is also a time consuming process.

SUMMARY

In one embodiment, a method for training a machine learning model for identifying entities from data is disclosed. The method may include creating a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples. Each of the first dataset and the second dataset are used to train a machine learning model to identify an entity from data, and wherein the first plurality of data samples comprise the entity and the second plurality of data samples do not comprise the entity. The method further includes determining a rank for each of the first plurality of clusters based on a probability of identification, as determined by the machine learning model, of an associated set of data samples within the first plurality of data samples as the entity. The method includes determining a rank for each of the second plurality of clusters based on a probability of mismatch, as determined by the machine learning model, of an associated set of data samples within the second plurality of samples, with the entity. The method further includes retraining the machine learning model using at least one of the first plurality of clusters weighted based on the rank determined for each of the first plurality of clusters and at least one of the second plurality of clusters weighted based on the rank determined for each of the second plurality of clusters.

In another embodiment, a method creating a machine learning model for identifying entities from data is disclosed. The methods may include creating a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples. The first plurality of data samples comprise an entity and the second plurality of data samples do not comprise the entity. The method further includes assigning the same rank to each of the first plurality of clusters based on the total number of the first plurality of clusters. The method includes determining a rank for each of the second plurality of clusters based on similarity with at least one cluster from the first plurality of clusters, wherein a cluster from the second plurality of clusters having highest similarity with the at least one cluster is assigned the lowest rank and a cluster from the second plurality of clusters having lowest similarity with the at least one cluster is assigned the highest rank. The method further includes creating a machine learning model to identify the entity, wherein the machine learning model is created using at least one of the first plurality of clusters weighted based on the rank assigned to each of the first plurality of clusters and at least one of the second plurality of clusters weighted based on the rank determined for each of the second plurality of clusters.

In yet another embodiment, an entity identification device for training a machine learning model for identifying entities from data is disclosed. The entity identification device includes a processor and a memory communicatively coupled to the processor, wherein the memory stores processor instructions, which, on execution, causes the processor to create a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples, wherein each of the first dataset and the second dataset are used to train a machine learning model to identify an entity from data, and wherein the first plurality of data samples comprise the entity and the second plurality of data samples do not comprise the entity; determine a rank for each of the first plurality of clusters based on a probability of identification, as determined by the machine learning model, of an associated set of data samples within the first plurality of data samples as the entity; determine a rank for each of the second plurality of clusters based on a probability of mismatch, as determined by the machine learning model, of an associated set of data samples within the second plurality of samples, with the entity; and retrain the machine learning model using at least one of the first plurality of clusters weighted based on the rank determined for each of the first plurality of clusters and at least one of the second plurality of clusters weighted based on the rank determined for each of the second plurality of clusters.

In another embodiment, an entity identification device for creating a machine learning model for identifying entities from data is disclosed. The entity identification device includes a processor and a memory communicatively coupled to the processor, wherein the memory stores processor instructions, which, on execution, causes the processor to create a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples, wherein the first plurality of data samples comprise an entity and the second plurality of data samples do not comprise the entity; assign the same rank to each of the first plurality of clusters based on the total number of the first plurality of clusters; determine a rank for each of the second plurality of clusters based on similarity with at least one cluster from the first plurality of clusters, wherein a cluster from the second plurality of clusters having highest similarity with the at least one cluster is assigned the lowest rank and a cluster from the second plurality of clusters having lowest similarity with the at least one cluster is assigned the highest rank; and create a machine learning model to identify the entity, wherein the machine learning model is created using at least one of the first plurality of clusters weighted based on the rank assigned to each of the first plurality of clusters and at least one of the second plurality of clusters weighted based on the rank determined for each of the second plurality of clusters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
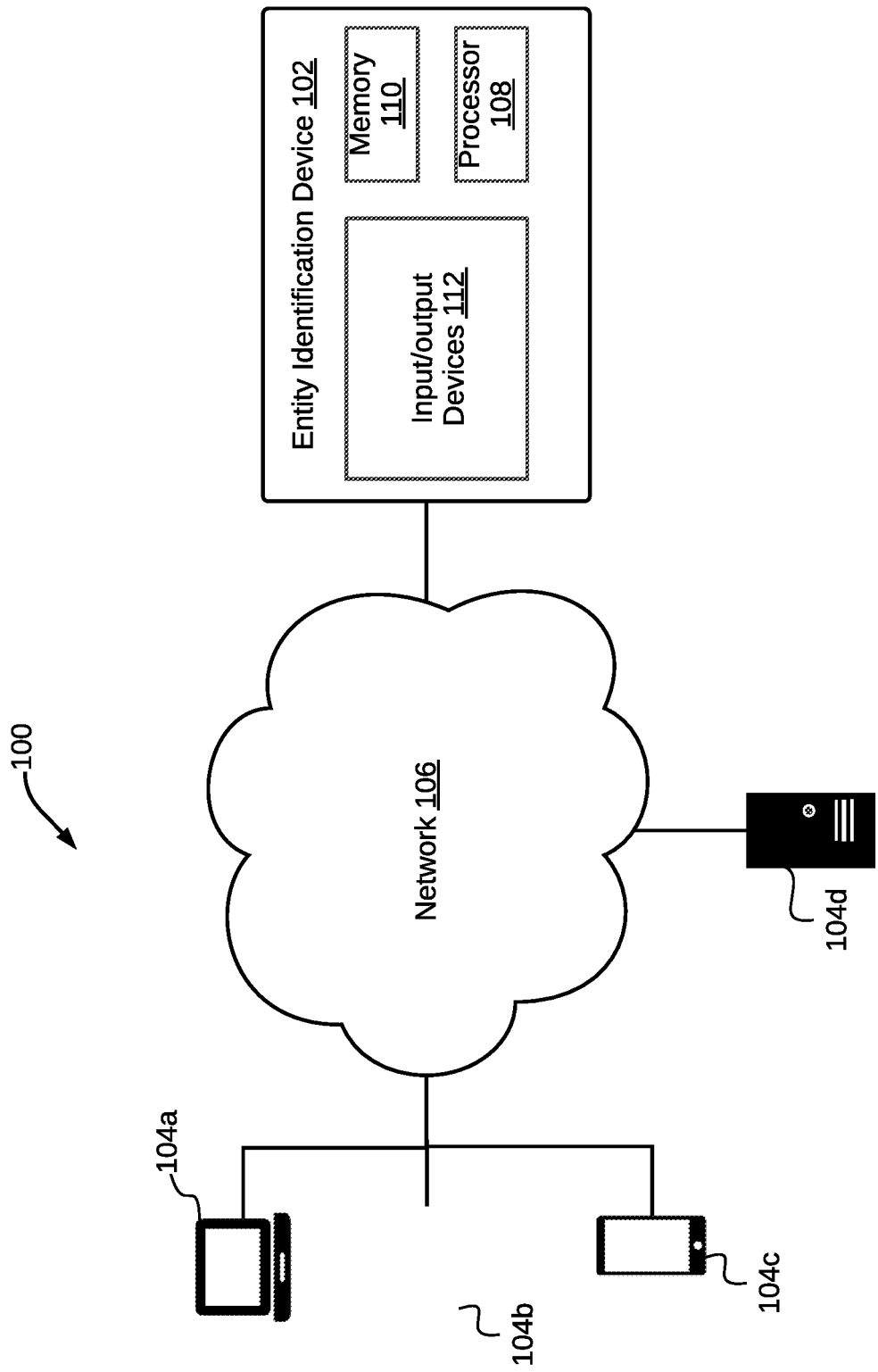
FIG. 1 illustrates a system for creating and training machine learning models, in accordance with an embodiment.

In one embodiment, a system 100 for creating and training machine learning models is illustrated in the FIG. 1, in accordance with an embodiment. The system 100 may include an entity identification device 102 and a plurality of computing devices 104. The entity identification device 102 may be a computing device having data processing capability. Examples of the entity identification device 102 may include, but are not limited to a server, a desktop, a laptop, a notebook, a netbook, a tablet, a smartphone, a mobile phone, an application server, a sever, or the like. In particular, the entity identification device 102 may have the capability to create and train machine learning models to identify entities within data. The data, for example, may include, but is not limited to images, text, or sensor data. The entities, for example, may include one or more of, but are not limited to a character, an animal, an object, or a human.

Further, examples of the plurality of computing devices 104 may include, but are not limited to a laptop 104a, a computer 104b, a smart phone 104c, and a server 104d. The entity identification device 102 is in communication with the plurality of computing devices 104 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). One or more of the plurality of computing devices 104 may provide data to the entity identification device 102, in order to identify one or more entities from within the data so provided.

In order to create and train a machine learning model to identify entities from data, the entity identification device 102 may include a processor 108 and a memory 110. The memory 110 may store instructions that, when executed by the processor 108, may cause the processor 108 to identify entities from data, as discussed in greater detail in FIG. 2 to FIG. 10. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The entity identification device 102 may further include one or more input/output devices 112 through which the entity identification device 102 may interact with a user and vice versa. By way of an example, the input/output devices 114 may be used to render identified entities to a user. The input/output devices 112, for example, may include a display.

Figure 2:
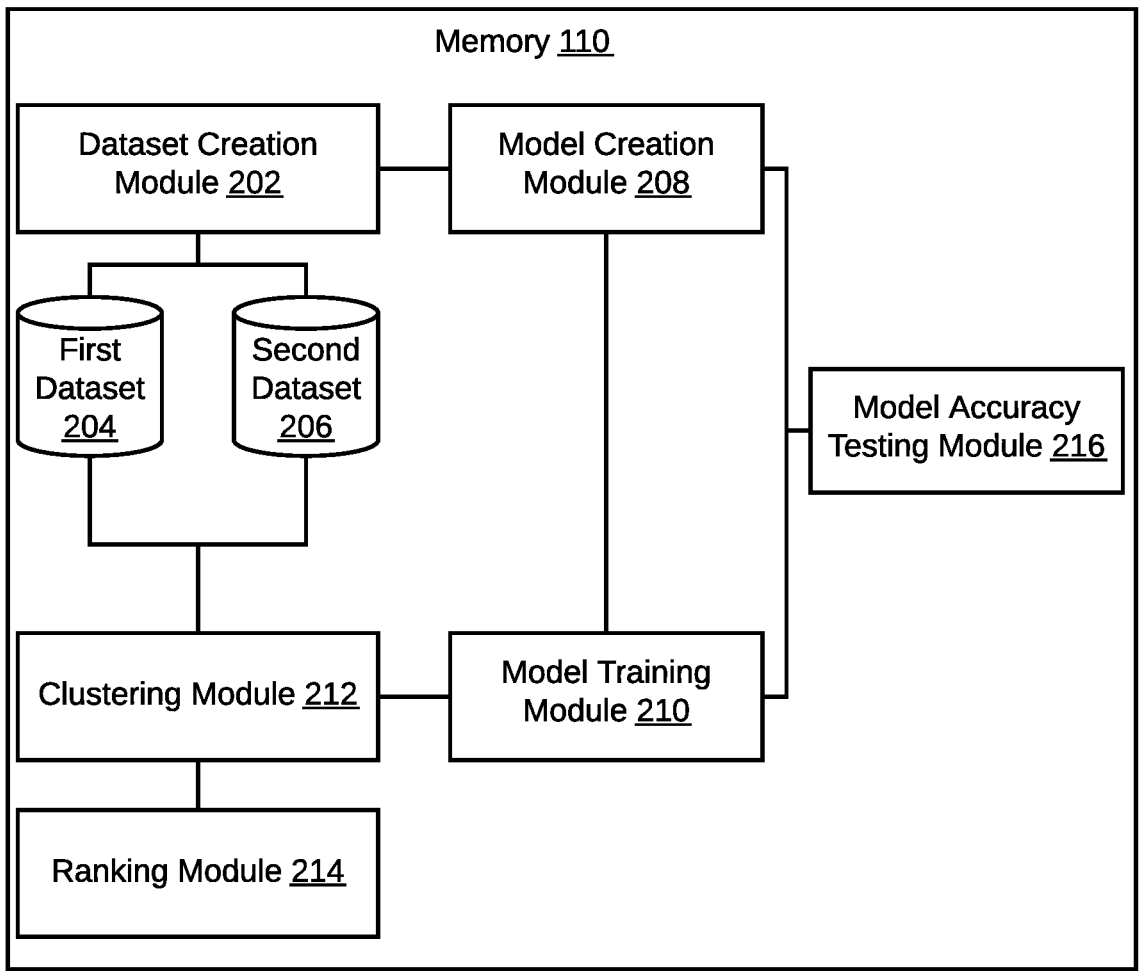
FIG. 2 is a functional block diagram of various modules within a memory of an entity identification device configured to create and train machine learning models, in accordance with an embodiment.

Referring now to FIG. 2, a functional block diagram of various modules within the memory 100 of the entity identification device 102 configured to create and train machine learning models is illustrated, in accordance with an embodiment. The memory 110 may include a dataset creation module 202, a first dataset 204, a second dataset 206, a model creation module 208, a model training module 210, a clustering module 212, a ranking module 214, and a model accuracy testing module 216.

The dataset creation module 202 creates the first dataset 204 that includes a first plurality of data samples and the second dataset 206 that includes a second plurality of data samples. The first plurality of data samples include an entity. Thus, the first dataset and the first plurality of data samples may correspond to a true set for the machine learning model, such that, the true set represents data that includes the entity. In contrast to the first plurality of data samples, the second plurality of data samples do not include the entity. Thus, the second dataset and the second plurality of data samples may correspond to a false set for the machine learning model, such that, the false set represents data that includes one or more other entities that are different from the entity. Each of the first dataset and the second dataset are used to train a machine learning model to identify the entity from data fed into the machine learning model. The functionality of the dataset creation module 202 is further explained in detail in conjunction with FIG. 7.

The first and second plurality of data samples may include, but are not limited to images, text, or sensor data. An entity, for example, may include, but is not limited to a character, an animal, an object, or a human. Further, the character, for example, may include but is not limited to a digit, a symbol, or an alphabet.

The clustering module 212 creates a first plurality of clusters from the first plurality of data samples in the first dataset 204 and a second plurality of clusters from the second plurality of data samples in the second dataset 204. The clustering module 212 creates the first plurality of clusters based on a first set of entity attributes associated with the first plurality of data samples. Similarly, the clustering module 212 creates the second plurality of clusters based on a second set of entity attributes associated with the second plurality of data samples. This is further explained in detail in conjunction with FIG. 3.

Once the clustering module 212 creates the first plurality of clusters and the second plurality of clusters, the ranking module 214 determines a rank for each of the first plurality of clusters based on a probability of identification of an associated set of data samples within the first plurality of data samples as the entity. The probability of identification of an associated set of data samples may be determined by the machine learning model. In an similar manner, the ranking module 214 determines a rank for each of the second plurality of clusters based on a probability of mismatch of an associated set of data samples within the second plurality of samples, with the entity. The probability of mismatch may be determined by the machine learning model. This is further explained in detail in conjunction with FIG. 5, FIG. 6, and FIG. 8.

Once the first plurality of clusters and the second plurality of clusters have been ranked, the model training module 210 may train the machine learning model using one or more of the first plurality of clusters weighted based on the rank determined for each of the first plurality of clusters. Additionally, the model training module 210 may retrain the machine learning model based on one or more of the second plurality of clusters weighted based on the rank determined for each of the second plurality of clusters. This is further explained in detail in conjunction with FIG. 3.

In an embodiment, the model creation module 208 may create a machine learning model to identify the entity using one or more of the first plurality of clusters weighted based on the rank assigned to each of the first plurality of clusters. The model creation module 208 may additionally create the machine learning model based on one or more of the second plurality of clusters weighted based on the rank determined for each of the second plurality of clusters. This is further explained in detail in conjunction with FIG. 8.

Once the machine learning model has been retrained, the model accuracy testing module 216 tests accuracy of the retrained machine learning model in identifying the entity from each of the first plurality of data samples and discarding each of the second plurality of data samples. This is further explained in detail in conjunction with FIG. 4. Additionally, once the machine learning model has been created, the model accuracy testing module 216 may test accuracy of the newly created machine learning model in identifying the entity from each of the first plurality of data samples and discarding each of the second plurality of data samples. This is further explained in detail in conjunction with FIG. 9.

Figure 3:
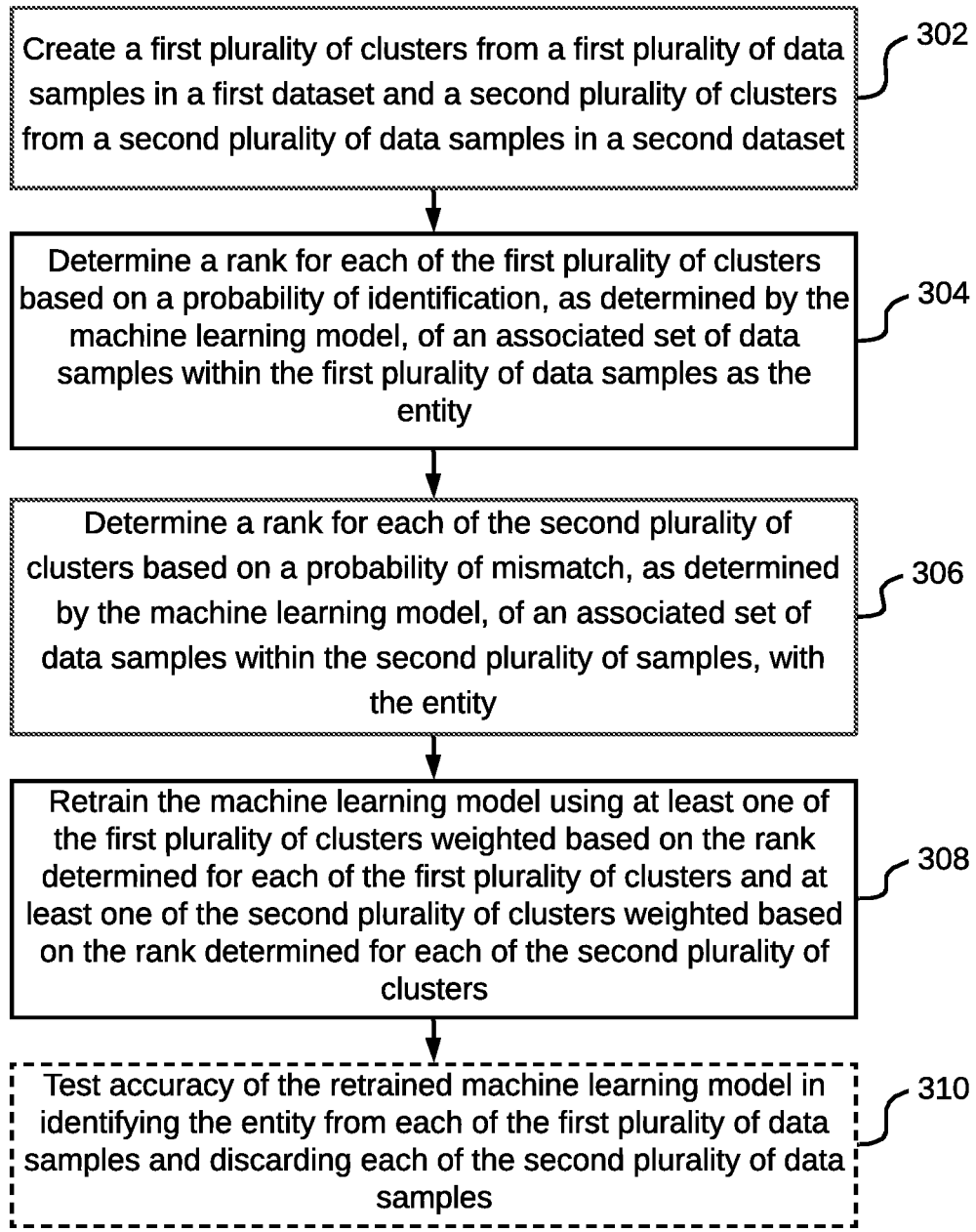
FIG. 3 illustrates a flowchart of a method for training a machine learning model to identify an entity from data, in accordance with an embodiment.

Referring now to FIG. 3, a flowchart of a method for training a machine learning model to identify an entity from data is illustrated, in accordance with an embodiment. At step 302, a first plurality of clusters are created from a first plurality of data samples in a first dataset (for example, the first dataset 204). The first plurality of data samples include the entity. Thus, the first dataset and the first plurality of data samples may correspond to a true set for the machine learning model, such that, the true set represents data that includes the entity. Additionally, at step 302, a second plurality of clusters are created from a second plurality of data samples in a second dataset (for example, the second dataset 204). In contrast to the first plurality of data samples, the second plurality of data samples do not include the entity. Thus, the second dataset and the second plurality of data samples may correspond to a false set for the machine learning model, such that, the false set represents data that includes one or more other entities that are different from the entity.

Each of the first and second plurality of data samples may include, but are not limited to images, text, or sensor data. An entity, for example, may include, but is not limited to a character, an animal, an object, or a human. The character, for example, may include but is not limited to a digit, a symbol, or an alphabet. Each of the first and second plurality of data samples in their respective datasets may be labelled. When data samples are image samples that include characters, each image sample may indicate the character that it refers to.

By way of an example, with regards to the first plurality of data samples being the true set and the second plurality of data samples being the false set, the data may be an image and the first plurality of data samples may include images of a dog (true set), while the second plurality of data samples may include images of a cat, a wolf, or a fox (false set). Each such image may be labelled based on the animal included therein. By way of another example, the data may be an image and the first plurality of data samples may include images of the digit (character) "3" (true set), while the second plurality of data samples may include images of all other digits (characters) other than "3" (false set). Each such image may be labelled based on the character included therein.

Each of the first dataset and the second dataset are used to train a machine learning model to identify the entity from data fed into the machine learning model. It will be apparent to a person skilled in the art that multiple such machine learning models may be trained, such that, each machine learning model is trained for a given entity. By way of an example, a machine learning model may be trained to identify "dogs," while another machine learning model may be trained to identify "cats."

The machine learning model may be trained on the first dataset and the second dataset to provide a probability of occurrence of the in a data sample. The machine learning model may output a probability close to 1, when the entity is identified and 0 if the identity is not identified. In an embodiment, when the first dataset and the second dataset include image samples. The data within image samples may be obtained by performing Optical Character Recognition (OCR) on the image samples in order to identify individual characters from the image samples. Each of the individual characters may later be recognized using an associated machine learning model trained for the same. A machine learning model trained to identify a character, may output a probability close to 1, when the character is identified and 0 if the character is not identified.

The first plurality of clusters are created based on a first set of entity attributes associated with the first plurality of data samples. Similarly, the second plurality of clusters are created based on a second set of entity attributes associated with the second plurality of data samples. Each of the first and second set of entity attributes include one or more features descriptive of the entity. In an embodiment, when the entity is a character, the first and second set of entity attributes may include one or more of, but is not limited to a size of the character, a font of the character, a style associated with the character, a thickness of the character, or a color of the character. In an embodiment, when the first and second plurality of data samples are images, entity attributes (the first and the second set) may be extracted from each image using image processing and feature extracting algorithms. Examples of such algorithm may include, but are not limited to SIFT™ or SURF™.

The first plurality of clusters may be created based on a first set of entity attributes associated with the first plurality of data samples. One cluster in the first plurality of clusters may include data samples that have similar attributes. By way of an example, when data samples includes images of digits, each cluster may include images that are similar to each other with respect to entity attributes that may include one or more of, but is not limited to size, font, style, or thickness of the digit. In a similar manner, the second plurality of clusters are created based on the second set of entity attributes associated with the second plurality of data samples.

At step 304, a rank is determined for each of the first plurality of clusters based on a probability of identification of an associated set of data samples within the first plurality of data samples, as the entity. The probability of identification of an associated set of data samples may be determined by the machine learning model. In other words, for a given cluster, the machine learning model determines a probability of identification of each data sample within the given cluster. Thereafter, based on the determined probability of identification of each data sample, the rank for the given cluster is determined. The first plurality of clusters are generated from the true set (the first plurality of data samples). Thus, when the probability of identification of data samples within a cluster is farther from 1, the cluster is assigned a higher rank so that the machine learning algorithm may be retrained for that cluster. Such retraining would increase the accuracy of the machine learning model in identifying the entity from the data samples within the cluster in future. This is further explained in detail in conjunction with FIG. 5.

In an similar manner, at step 306, a rank is determined for each of the second plurality of clusters based on a probability of mismatch of an associated set of data samples within the second plurality of samples, with the entity. The probability of mismatch may be determined by the machine learning model. The second plurality of clusters are generated from the false set (the second plurality of data samples). Thus, when the probability of mismatch of data samples within a cluster is closer to 0, this would mean that the machine learning model is misidentifying the data samples within the cluster. Thus, in this case, the cluster is assigned a higher rank so that the machine learning algorithm may be retrained for that cluster. Such retraining would increase the accuracy of the machine learning model in identifying that the data samples within the cluster do not include the entity. This is further explained in detail in conjunction with FIG. 6.

At step 308, the machine learning model may be retrained using one or more of the first plurality of clusters weighted based on the rank determined for each of the first plurality of clusters (which are the cluster for the true set). In an embodiment, for the first plurality of clusters, one or more clusters are selected, such that, ranks assigned to each of the one or more clusters are low. For these one or more clusters, the probability of identification determined for a set of data samples within the one or more clusters may be farther from 1. Weights may be assigned to the one or more clusters in descending order of assigned ranks, such that, highest weight may be assigned to a cluster that has the lowest rank. By way of an example, if there are three clusters, i.e., a cluster 1 with rank 3, a cluster 2 with rank 2, and a cluster 3 with rank 1, the cluster 1 may be assigned the highest weight, while the cluster 1 may be assigned the lowest weight.

At step 308, the machine learning model may additionally be retrained based on one or more of the second plurality of clusters weighted based on the rank determined for each of the second plurality of clusters (which are the cluster for the false set). In an embodiment, for the second plurality of clusters, one or more clusters are selected, such that, ranks assigned to each of the one or more clusters are high. For these one or more clusters, the probability of mismatch determined for a set of data samples within the one or more clusters may be closer to 1. Weights may be assigned to one or more clusters in ascending order of assigned ranks, such that, highest weight may be assigned to a cluster that has the highest rank. By way of an example, if there are three clusters, i.e., a cluster 1 with rank 3, a cluster 2 with rank 2, and a cluster 3 with rank 1, the cluster 3 may be assigned the highest weight, while the cluster 3 may be assigned the lowest weight.

In order to retrain the machine learning model, only a subset of data samples may be used from the one or more clusters identified at step 308. In an embodiment, the quantum of data samples to be extracted from a cluster may be determined based on the weight assigned to the cluster. In other words, for a cluster that is assigned a higher weight, more data samples from the cluster may be used to retrain the machine learning model. In contrast, for a cluster that is assigned a lower weight, less data samples from the cluster may be used to retrain the machine learning model. At step 310, accuracy of the retrained machine learning model in identifying the entity from each of the first plurality of data samples and discarding each of the second plurality of data samples is tested. This is further explained in detail in conjunction with FIG. 4.

Figure 4:
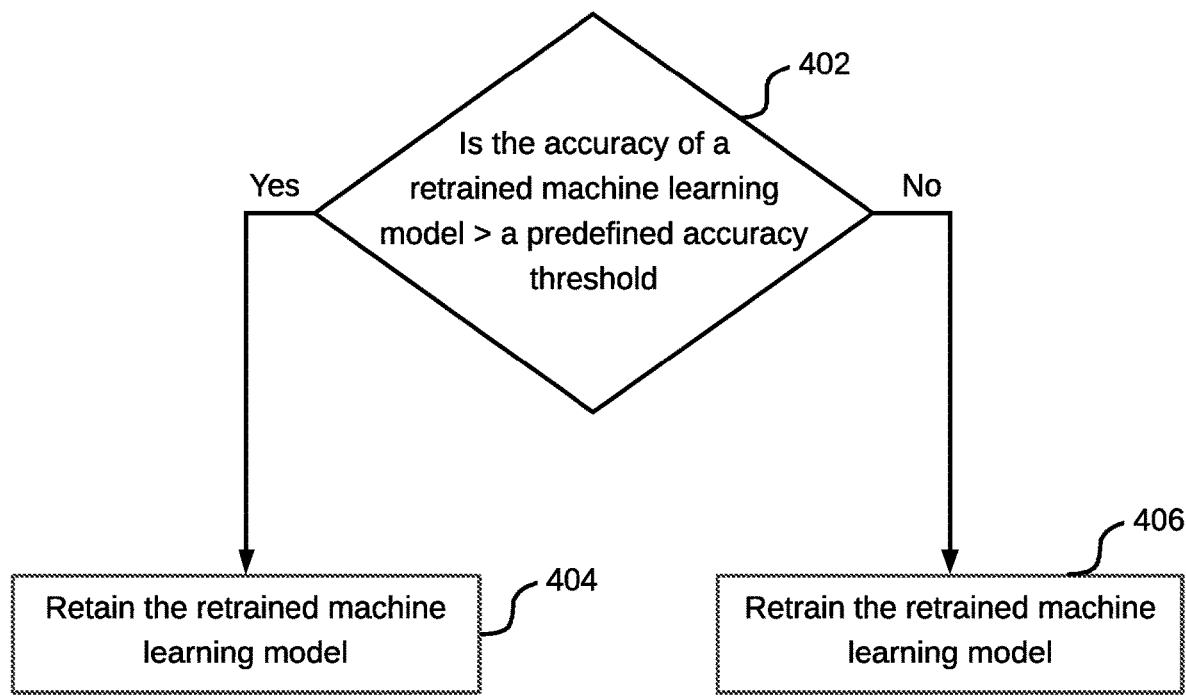
FIG. 4 illustrates a flowchart of a method for determining accuracy of a retrained machine learning model and accordingly retaining or retraining the retrained machine learning model, in accordance with an embodiment.

Referring now to FIG. 4, a flowchart of a method for testing accuracy of a retrained machine learning model and accordingly retaining or retraining the retrained machine learning model is illustrated, in accordance with an embodiment. Once the machine learning mode has been trained, at step 402, a check is performed to determine if the accuracy of the retained machine learning model is greater than a predefine accuracy threshold. The predefined accuracy threshold may be the accuracy of the machine learning model, prior to retraining, in identifying the entity from each of the first plurality of data samples and discarding each of the second plurality of data samples. Thus, the accuracy of the retrained machine learning model may be compared with the accuracy of the machine learning model.

Referring back to step 402, when the accuracy of the retrained machine learning model is greater than the predefined accuracy threshold, the retrained machine learning model is retained for further use at step 404. In this case, the machine learning model, prior to retraining, may be discarded. However, when the accuracy of the retrained machine learning model is less than or equal to the predefined accuracy threshold, the retrained machine learning model is retrained at step 406. To this end, steps 302 to 310 may be performed for the retrained machine learning model.

Figure 5:
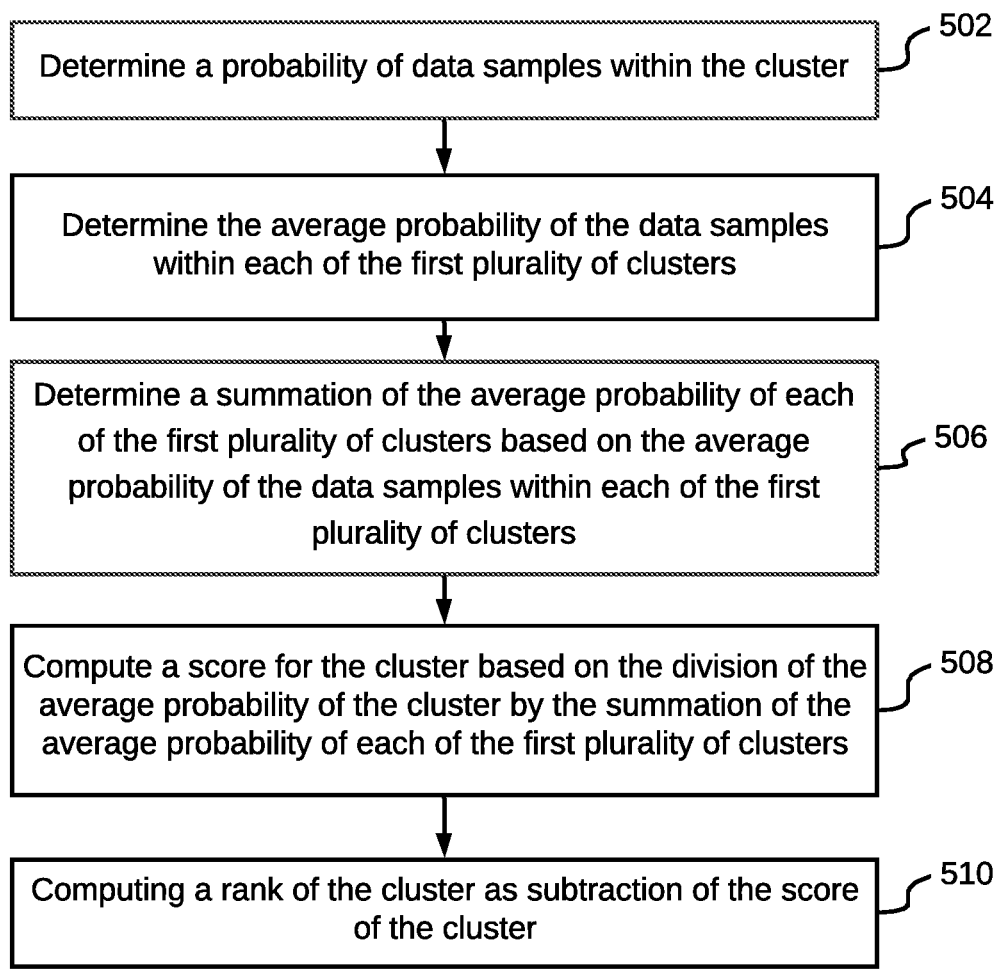
FIG. 5 illustrates a flowchart of a method for determining ranks for a first plurality of clusters created from a first dataset, in accordance with an embodiment.

Referring now to FIG. 5, a flowchart of a method for determining rank for a cluster from the first plurality of clusters is illustrated, in accordance with an embodiment. At step 502, the machine learning model determines a probability of data samples within the cluster. The probability of data samples within the cluster corresponds to the probability of identification of the entity from the data samples by the machine learning model. At step 504, the machine learning model determines the average probability of data samples within each of the first plurality of clusters.

At step 506, a summation of the average probability of each of the first plurality of clusters is determined based on the average probability of the data samples within each of the first plurality of clusters. At step 508, a score is computed for the cluster based on the division of the average probability of the cluster by the summation of the average probability of each of the first plurality of clusters. Thereafter, at step 510, a rank of the cluster is computed as subtraction of the score of the cluster from one.

By way of an example, there may be a total of three clusters, i.e., a cluster 1 with an average probability of 0.7, a cluster 2 with an average probability of 0.9, and a cluster 3 with an average probability of 0.8 respectively. A rank for each of the cluster 1, the cluster 2, and the cluster 3, may be determined using the equation 1 given below:

$$\text{Cluster Rank} = 1 - (\text{Average probability of a Cluster}/\Sigma (\text{Average probability of each of the first plurality of clusters})) \quad (1)$$

Thus, based on the equation 1 above, the cluster 1 has the highest rank, followed by the cluster 3 and the cluster 2. In other words, the cluster with the lowest average probability is assigned the highest rank, while the cluster with the highest average probability is assigned the lowest rank.

Figure 6:
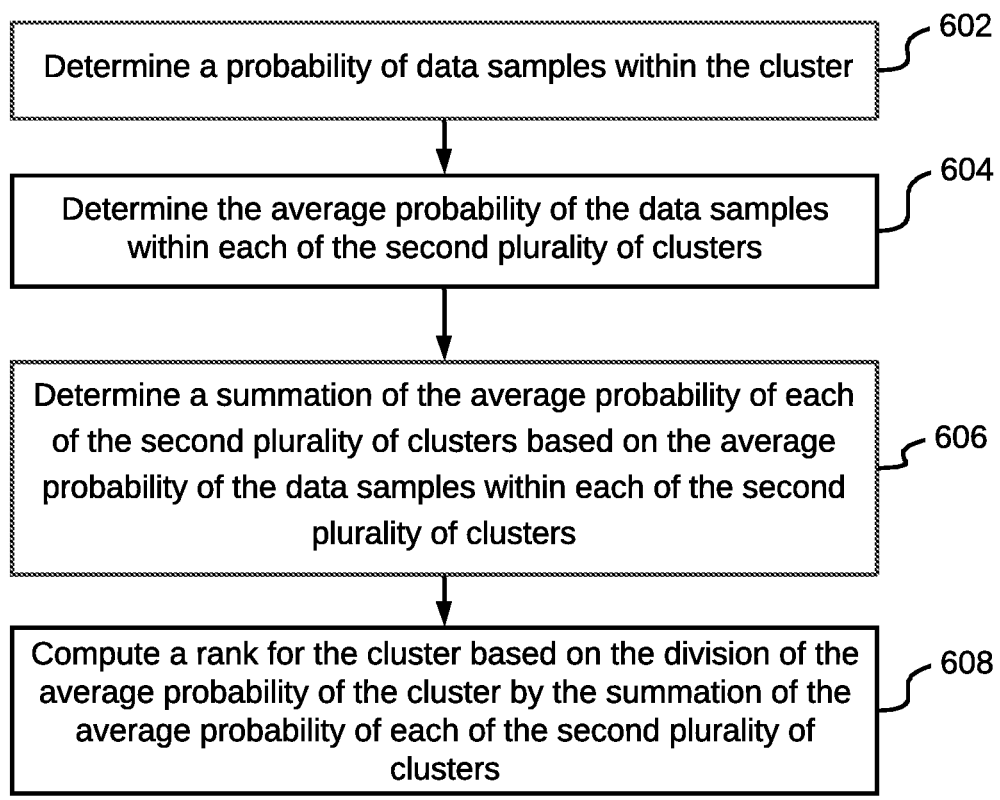
FIG. 6 illustrates a flowchart of a method for determining ranks for a second plurality of clusters created from a second dataset, in accordance with an embodiment.

Referring now to FIG. 6, a flowchart of a method for determining a rank for a cluster from the second plurality of clusters is illustrated, in accordance with an embodiment. At step 602, the machine learning model determined a probability of data samples within the cluster. The probability of data samples within the cluster corresponds to the probability of mismatch of the entity from the data samples. At step 604, the machine learning model determines the average probability of the data samples within each of the second plurality of clusters.

At step 606, a summation of the average probability of each of the second plurality of clusters is determined based on the average probability of the data samples within each of the second plurality of clusters. At step 608, a rank is computed for the cluster based on the division of the average probability of the cluster by the summation of the average probability of each of the second plurality of clusters.

By way of an example, there may be a total of three clusters, i.e., a cluster 1 with an average probability of 0.2, a cluster 2 with an average probability of 0.5, and a cluster 3 with an average probability of 0.1 respectively. A rank for each of the cluster 1, the cluster 2, and the cluster 3, may be determined using the equation 2 given below:

$$\text{Cluster Rank} = \text{Average probability of a Cluster}/\Sigma (\text{Average probability of each of the second plurality of clusters})) \quad (2)$$

Thus, based on the equation 2 above, the cluster 2 has the highest rank, followed by the cluster 1, and the cluster 3. In other words, the cluster with the highest average probability is assigned the highest rank, while the cluster with the lowest average probability is assigned the lowest rank.

Figure 7:
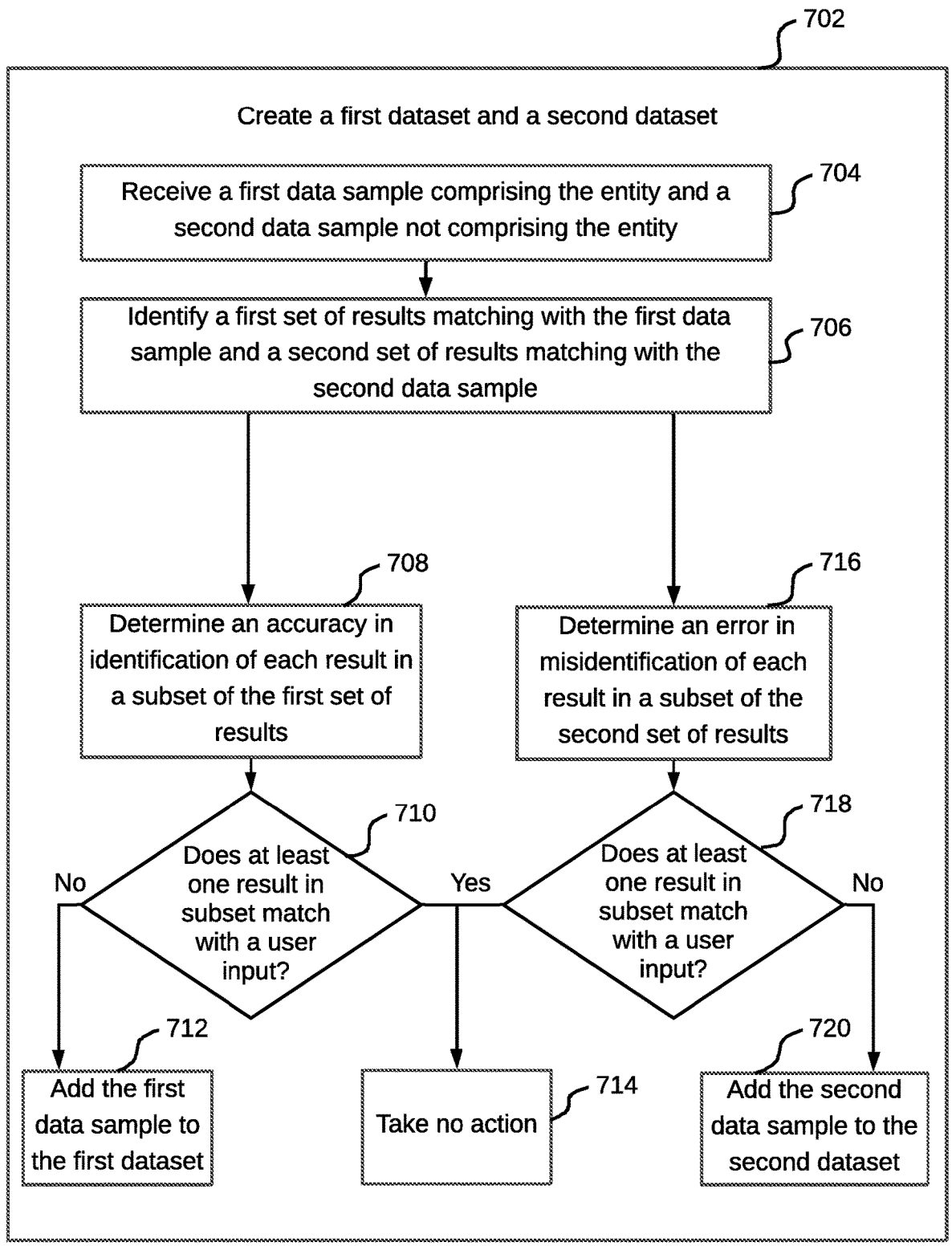
FIG. 7 illustrates a flowchart of a method for creating a first dataset that includes a first plurality of data samples and a second dataset that includes a second plurality of data samples, in accordance with an embodiment.

Referring now to FIG. 7, a flowchart of a method 702 for creating a first dataset that includes a first plurality of data samples and a second dataset that includes a second plurality of data samples is illustrated, in accordance with an embodiment. At step 704, a machine learning model receives a first data sample that includes the entity and a second data sample that does not include the entity. The first and second data sample, for example, may be images, such that the first data sample is an image that includes a dog, while the second data sample is an image that includes a cat. Additionally, the machine learning model may be trained to identify dogs from within images.

At step 706, the machine learning model identifies a first set of results that match with the first data sample and a second set of results that match with the second data sample. After step 706, step 708 and step 716 may be executed parallelly.

At step 708, the accuracy in identification of each result in a subset of the first set of results, by the machine learning model, is determined In other words, a subset may be first selected from the first set of results. Thereafter, accuracy in identification of each result in the subset is determined. The subset may be selected based on a predefined criterion. The predefined criterion, for example, may be selecting top N results. By way of an example, top 3 results may be selected and accuracy in identification of each of these 3 results, by the machine learning model, may be determined. In an embodiment, the accuracy in identification is based on a user input corresponding to the first data sample. Each result in the subset (or the top N results) may be presented to the user via a user interface. The user may either select one of the result in the subset or may provide a correct result, that is not included in the subset.

Thereafter, at step 710, a check is performed to determine whether at least one result in the subset matches with the user input. If each result in the subset does not match with the user input, the first data sample is added to the first dataset at step 712. However, if at least one result in the subset matches with the user input, no further action is taken at step 714. By way of an example, when an image of a dog is provided to the machine learning model, the output may be: Dog, Wolf, or Fox. In this case, the user may validate the accuracy in identification by the machine learning algorithm. However, when the output may be: Cat, Wolf, or Fox, the user may provide "Dog" as the correct option and may ignore each of the result provided as the output. Thus, the user validates inaccuracy in the machine learning model to identify "Dog" from the provided image. In this case, the image of dog is added to the first dataset (true set) in order to retrain the machine learning algorithm using this image.

At step 716, an error in misidentification of each of a subset of the second set of results is determined. The subset is selected based on the predefined criterion. The error is determined based on a user input corresponding to the second data sample. At step 718, a check is performed to determine whether at least one result in the subset matches with the user input. If each result in the subset does not match with the user input, the second data sample is added to the second dataset at step 720. However, if at least one result in the subset matches with the user input, control goes to step 714, where no further action is taken. By way of an example, when an image of a cat is provided to the machine learning model, the output may be: Dog, Cheetah, or Fox. The user may provide "Cat" as the correct option and may ignore each of the result provided as the output. Thus, the user validates error in misidentification of "Cat" as "Dog," by the machine learning model. In this case, the image of cat is added to the second dataset (false set) in order to retrain the machine learning algorithm using this image. However, when the output may be: Cat, Wolf, or Fox, the user may validate that there is no error in misidentification by the machine learning algorithm, for the given image.

Figure 8:
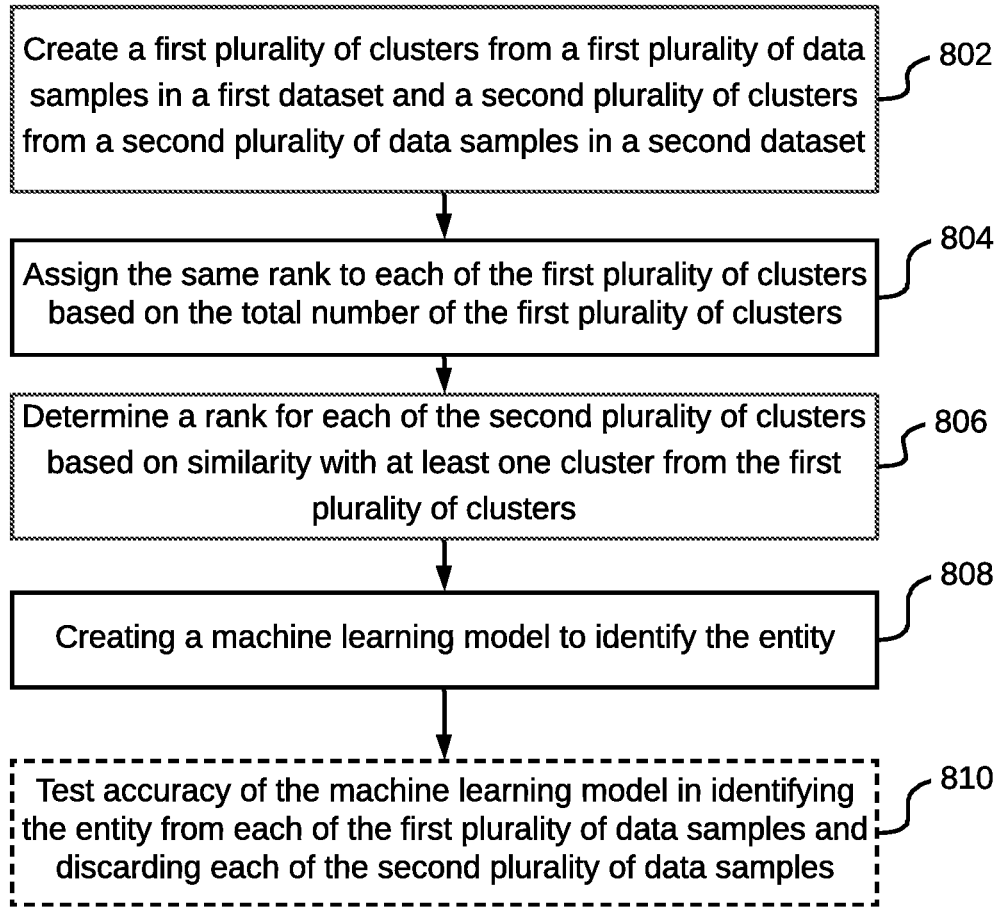
FIG. 8 illustrates a flowchart of a method for creating a machine learning model to identify an entity from data, in accordance with an embodiment.

Referring now to FIG. 8, a flowchart of a method for creating a machine learning model is illustrated, in accordance with an embodiment. At step 802, based on a first set of entity attributes associated with the first plurality of data samples, a first plurality of clusters are created from the first plurality of data samples in the first dataset. The first plurality of data samples include an entity. Additionally, at step 802, based on a second set of entity attributes associated with the second plurality of data samples, a second plurality of clusters are created from the second plurality of data samples in the second dataset. In contrast to the first plurality of data samples, the second plurality of data samples do not include the entity. This has been explained in detail in conjunction with FIG. 3.

Based on the total number of the first plurality of clusters, the same rank is assigned to each of the first plurality of clusters at step 804. At step 806, a rank is determined for each of the second plurality of clusters based on similarity with one or more clusters from the first plurality of clusters. A cluster from the second plurality of clusters that has the highest similarity (or closest distance) with the one or more clusters is assigned the lowest rank. Similarly, a cluster from the second plurality of clusters that has lowest similarity (or highest distance) with the one or more clusters is assigned the highest rank.

At step 808, a machine learning model to identify the entity is created using one or more of the first plurality of clusters weighted based on the rank assigned to each of the first plurality of clusters. The machine learning model is additionally created based on one or more of the second plurality of clusters weighted based on the rank determined for each of the second plurality of clusters. This has already been discussed in detail in conjunction with FIG. 3. At step 810, accuracy of the machine learning model in identifying the entity from each of the first plurality of data samples and discarding each of the second plurality of data samples is tested. This is further explained in detail in conjunction with FIG. 9.

Figure 9:
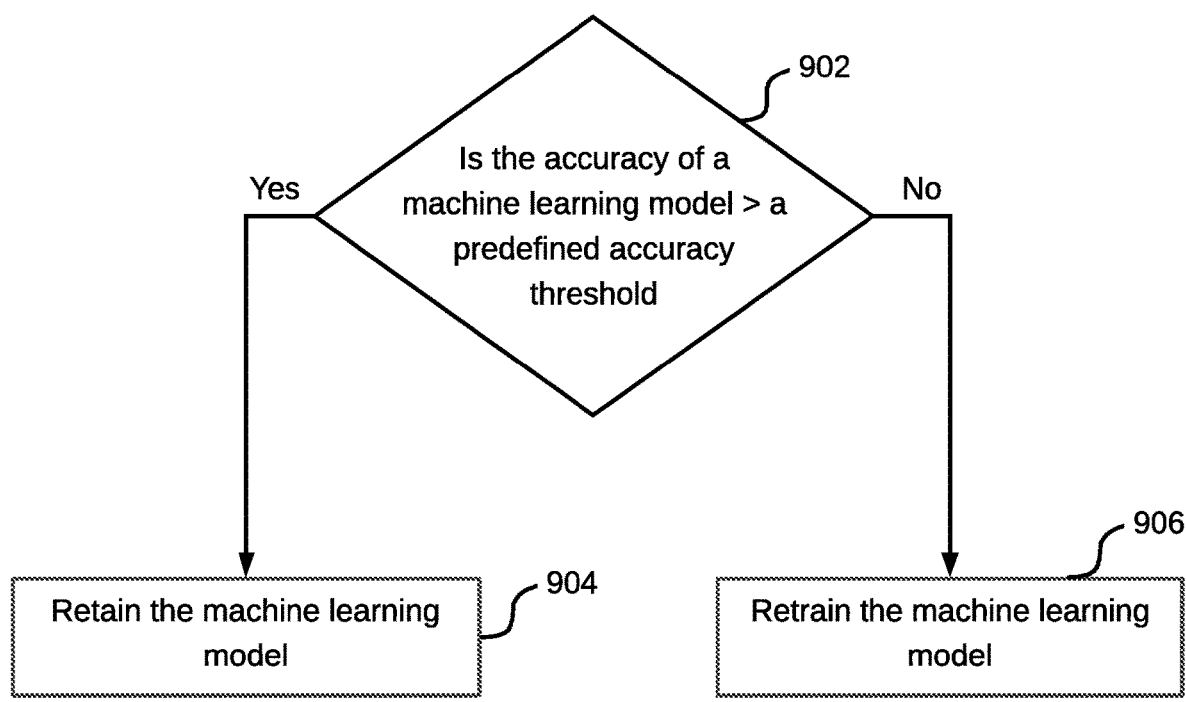
FIG. 9 illustrates a flowchart of a method for determining accuracy of a machine learning model and accordingly retaining or retraining the machine learning model, in accordance with an embodiment.

FIG. 9 illustrates a flowchart of a method for testing accuracy of a machine learning model and accordingly retaining or retraining the machine learning model, in accordance with an embodiment. Once the machine learning mode has been created, at step 902, a check is performed to determine if the accuracy of the machine learning model is greater than a predefined accuracy threshold. The predefined accuracy threshold may be the accuracy of a similar machine learning model, in identifying a similar entity from each of a true set data samples and discarding each of the false set of data samples. Thus, the accuracy of the machine learning model may be compared with the accuracy of similar existing machine learning models.

Referring back to step 902, when the accuracy of the machine learning model is greater than the predefined accuracy threshold, the machine learning model is retained for further use at step 904. However, when the accuracy of the machine learning model is less than or equal to the predefined accuracy threshold, the machine learning model is retrained at step 906. This is further explained in detail in conjunction with FIG. 10.

Figure 10:
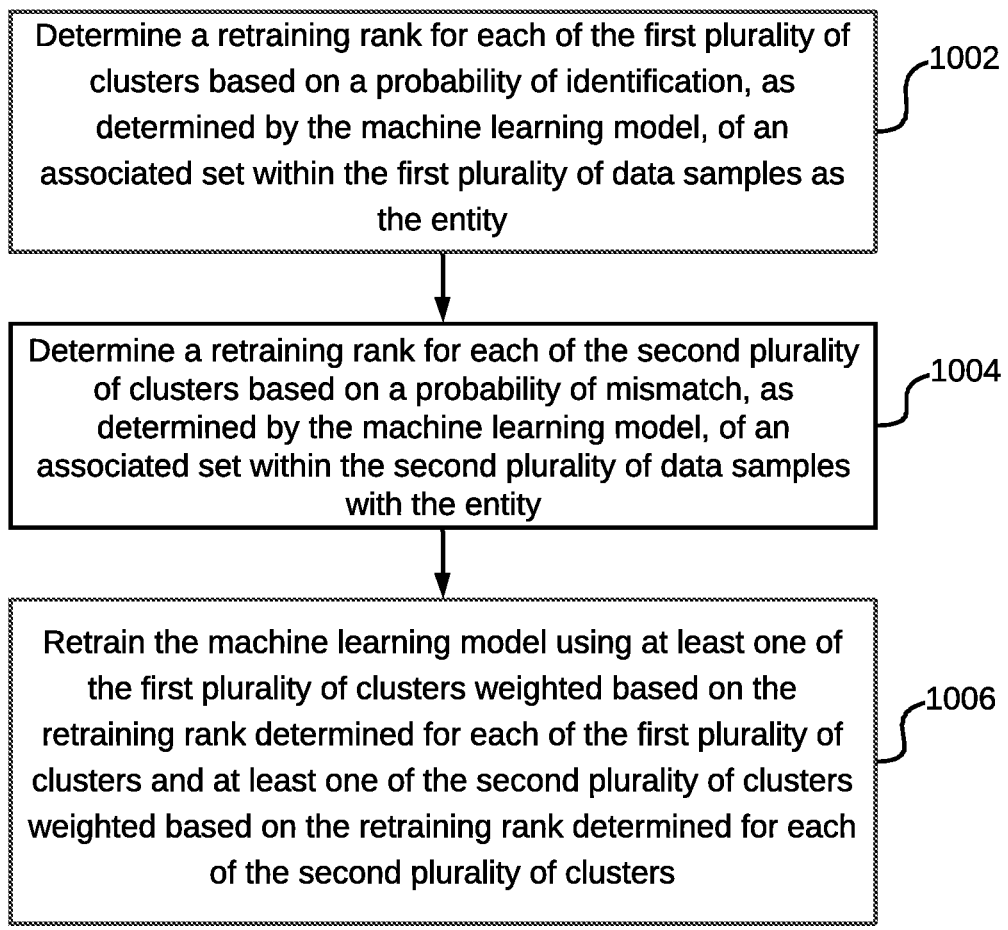
FIG. 10 illustrates a flowchart of a method for retraining a machine learning model, in accordance with an embodiment.

Referring now to FIG. 10, a flowchart of a method for retraining a machine learning model, in accordance with an embodiment. Once the machine learning model has been created as detailed in FIG. 8, at step 1002, a retraining rank is determined for each of the first plurality of clusters based on a probability of identification, as determined by the machine learning model, of an associated set within the first plurality of data samples as the entity. At step 1004, a retraining rank is determined for each of the second plurality of clusters based on a probability of mismatch, as determined by the machine learning model, of an associated set within the second plurality of data samples with the entity. At step 1006, the machine learning model is retrained using one or more of the first plurality of clusters weighted based on the retraining rank determined for each of the first plurality of clusters and one or more of the second plurality of clusters weighted based on the retraining rank determined for each of the second plurality of clusters. This has already been explained in detail on conjunction with FIG. 3.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
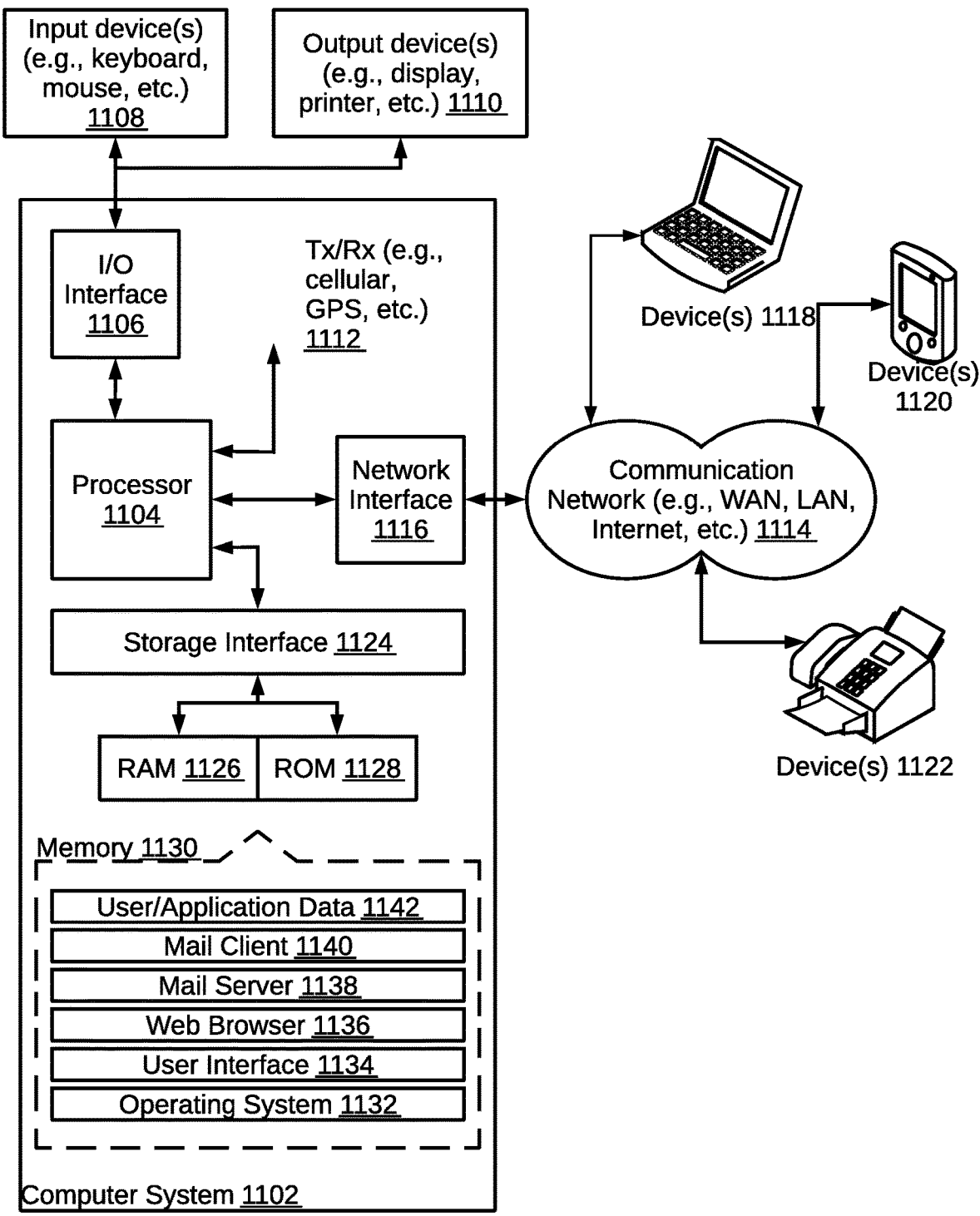
FIG. 11 illustrates a block diagram of an exemplary computer system for implementing various embodiments.

The disclosed methods and systems may be implemented on a conventional or a general-purpose computer system, such as a personal computer (PC) or server computer. Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or data repository components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Some conventional machine learning algorithms that are trained to perform OCR, are trained on similar set of data and are therefore not able to accurately identify data with good accuracy. Some other conventional machine learning algorithms require adding multiple variants of data in a database in order to be trained for performing OCR. However, such machine learning models need to be continuously updated in order to handle new variants of data. Pushing all such variants of data (for example, multiple variations of character images) to the database may overload it. Moreover, manually selecting and adding variants of data to the database requires people expertise and is a time consuming process.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for training a machine learning model for identifying entities from data, the method comprising:
creating a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples, wherein each of the first dataset and the second dataset are used to train a machine learning model to identify an entity from data, and wherein the first plurality of data samples comprise the entity and the second plurality of data samples do not comprise the entity;
determining a rank for each of the first plurality of clusters based on a probability of identification, as determined by the machine learning model, of an associated set of data samples within the first plurality of data samples as the entity;
determining a rank for each of the second plurality of clusters based on a probability of mismatch, as determined by the machine learning model, of an associated set of data samples within the second plurality of samples, with the entity; and
retraining the machine learning model using at least one of the first plurality of clusters weighted based on the rank determined for each of the first plurality of clusters and at least one of the second plurality of clusters weighted based on the rank determined for each of the second plurality of clusters.

2. The method of claim 1, wherein the entity comprises at least one of a character, an animal, an object, a human, text, or sensor data.

3. The method of claim 2, wherein, when the entity comprises a character, the first set of attributes and the second set of attributes comprises at least one of a size of the character, a font of the character, a style associated with the character, a thickness of the character, or a color of the character.

4. The method of claim 1, wherein the first set of attributes and the second set of attributes comprises at least one feature descriptive of the entity.

5. The method of claim 1, wherein determining a rank for a cluster from the first plurality of clusters comprises:
   determining, by the machine learning model, a probability of data samples within the cluster;
   determining, by the machine learning model, the average probability of the data samples within each of the first plurality of clusters;
   determining a summation of the average probability of each of the first plurality of clusters based on the average probability of the data samples within each of the first plurality of clusters;
   computing a score for the cluster based on the division of the average probability of the cluster by the summation of the average probability of each of the first plurality of clusters; and
   computing a rank of the cluster as subtraction of the score of the cluster.

6. The method of claim 1, wherein determining a rank for a cluster from the second plurality of clusters comprises:
   determining, by the machine learning model a probability of data samples within the cluster;
   determining, by the machine learning model, the average probability of the data samples within each of the second plurality of clusters;
   determining a summation of the average probability of each of the second plurality of clusters based on the average probability of the data samples within each of the second plurality of clusters; and
   computing a rank for the cluster based on the division of the average probability of the cluster by the summation of the average probability of each of the second plurality of clusters.

7. The method of claim 1 further comprising creating the first dataset comprising the first plurality of data samples and the second dataset comprising the second plurality of data samples.

8. The method of claim 7, wherein creating the first dataset and the second dataset comprises:
   receiving, by the machine learning model, a first data sample comprising the entity and a second data sample not comprising the entity;
   identifying, by the machine learning model, a first set of results matching with the first data sample and a second set of results matching with the second data sample;
   determining accuracy in identification of each result in a subset of the first set of results, based on a user input corresponding to the first data sample, wherein the subset is selected based on a predefined criterion; and
   determining error in misidentification of each result in a subset of the second set of results, based on a user input corresponding to the second data sample, wherein the subset is selected based on the predefined criterion.

9. The method of claim 8, further comprising adding the first data sample to the first dataset, when each result in the subset of the first set of results does not match with the user input.

10. The method of claim 7, further comprising adding the second data sample to the second dataset, when each result in the subset of the second set of results does not match with the user input.

11. The method of claim 1 further comprising testing accuracy of the retrained machine learning model in identifying the entity from each of the first plurality of data samples and discarding each of the second plurality of data samples, wherein testing the accuracy comprises:
   determining whether the accuracy of the retrained machine learning model is greater than a predefined accuracy threshold; and
   retraining the retrained machine learning model, when the accuracy of the retrained machine learning model is less than the predefined accuracy threshold.

12. A method for creating a machine learning model for identifying entities from data, the method comprising:
   creating a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples, wherein the first plurality of data samples comprise an entity and the second plurality of data samples do not comprise the entity;
   assigning the same rank to each of the first plurality of clusters based on the total number of the first plurality of clusters;
   determining a rank for each of the second plurality of clusters based on similarity with at least one cluster from the first plurality of clusters, wherein a cluster from the second plurality of clusters having highest similarity with the at least one cluster is assigned the lowest rank and a cluster from the second plurality of clusters having lowest similarity with the at least one cluster is assigned the highest rank; and
   creating a machine learning model to identify the entity, wherein the machine learning model is created using at least one of the first plurality of clusters weighted based on the rank assigned to each of the first plurality of clusters and at least one of the second plurality of clusters weighted based on the rank determined for each of the second plurality of clusters.

13. The method of claim 12 further comprising:
   determining a retraining rank for each of the first plurality of clusters based on a probability of identification, as determined by the machine learning model, of an associated set within the first plurality of data samples as the entity;
   determining a retraining rank for each of the second plurality of clusters based on a probability of mismatch, as determined by the machine learning model, of an associated set within the second plurality of data samples with the entity; and
   retraining the machine learning model using at least one of the first plurality of clusters weighted based on the retraining rank determined for each of the first plurality of clusters and at least one of the second plurality of clusters weighted based on the retraining rank determined for each of the second plurality of clusters.

14. The method of claim 12 further comprising testing accuracy of the machine learning model in identifying the entity from each of the first plurality of data samples and discarding each of the second plurality of data samples, wherein testing the accuracy comprises:
  determining whether the accuracy of the retrained machine learning model is greater than a predefined accuracy threshold; and
  retraining the machine learning model, when the accuracy of the retrained machine learning model is less than the predefined accuracy threshold.

15. An entity identification device for training a machine learning model for identifying entities from data, the entity identification device comprising:
  a processor; and
  a memory communicatively coupled to the processor, wherein the memory stores processor instructions, which, on execution, causes the processor to:
    create a first plurality of clusters from a first plurality of data samples in a first dataset, based on a first set of entity attributes associated with the first plurality of data samples and a second plurality of clusters from a second plurality of data samples in a second dataset, based on a second set of entity attributes associated with the second plurality of data samples, wherein each of the first dataset and the second dataset are used to train a machine learning model to identify an entity from data, and wherein the first plurality of data samples comprise the entity and the second plurality of data samples do not comprise the entity;
    determine a rank for each of the first plurality of clusters based on a probability of identification, as determined by the machine learning model, of an associated set of data samples within the first plurality of data samples as the entity;
    determine a rank for each of the second plurality of clusters based on a probability of mismatch, as determined by the machine learning model, of an associated set of data samples within the second plurality of samples, with the entity; and
    retrain the machine learning model using at least one of the first plurality of clusters weighted based on the rank determined for each of the first plurality of clusters and at least one of the second plurality of clusters weighted based on the rank determined for each of the second plurality of clusters.

16. The entity identification device of claim 15, wherein to determine a rank for a cluster from the first plurality of clusters, the processor instructions further cause the processor to:
  determine, by the machine learning model, a probability of data samples within the cluster;
  determine, by the machine learning model, the average probability of the data samples within each of the first plurality of clusters;
  determine a summation of the average probability of each of the first plurality of clusters based on the average probability of the data samples within each of the first plurality of clusters;
  compute a score for the cluster based on the division of the average probability of the cluster by the summation of the average probability of each of the first plurality of clusters; and
  compute a rank of the cluster as subtraction of the score of the cluster.

17. The entity identification device of claim 15, wherein to determine a rank for a cluster from the second plurality of clusters, the processor instructions further cause the processor to:
  determine, by the machine learning model, a probability of data samples within the cluster;
  determine, by the machine learning model, the average probability of the data samples within each of the second plurality of clusters;
  determine a summation of the average probability of each of the second plurality of clusters based on the average probability of the data samples within each of the second plurality of clusters; and
  compute a rank for the cluster based on the division of the average probability of the cluster by the summation of the average probability of each of the second plurality of clusters.

18. The entity identification device of claim 15, wherein the processor instructions further cause the processor to:
  create the first dataset comprising the first plurality of data samples and the second dataset comprising the second plurality of data samples, and wherein to create the first dataset and the second dataset, the processor instructions further cause the processor to:
    receive, by the machine learning model, a first data sample comprising the entity and a second data sample not comprising the entity;
    identify, by the machine learning model, a first set of results matching with the first data sample and a second set of results matching with the second data sample;
    determine accuracy in identification of each result in a subset of the first set of results, based on a user input corresponding to the first data sample, wherein the subset is selected based on a predefined criterion; and
    determine error in misidentification of each result in a subset of the second set of results, based on a user input corresponding to the second data sample, wherein the subset is selected based on the predefined criterion;
    add the first data sample to the first dataset, when each result in the subset of the first set of results does not match with the user input; and
    add the second data sample to the second dataset, when each result in the subset of the second set of results does not match with the user input.

19. The entity identification device of claim 15, wherein the processor instructions further cause the processor to test accuracy of the retrained machine learning model in identifying the entity from each of the first plurality of data samples and discarding each of the second plurality of data samples, wherein to test the accuracy, the processor instructions further cause the processor to:
  determine whether the accuracy of the retrained machine learning model is greater than a predefined accuracy threshold; and
  retrain the retrained machine learning model, when the accuracy of the retrained machine learning model is less than the predefined accuracy threshold.

* * * * *